Figure 1:
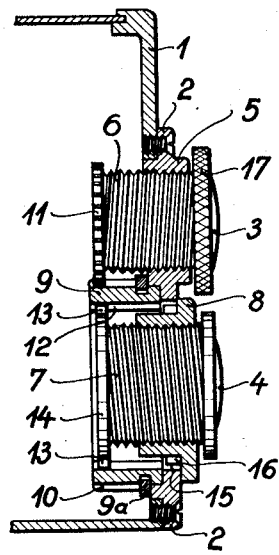

Dec. 15, 1936.  H. C. DECKEL  2,064,341

PHOTOGRAPHIC CAMERA

Filed Oct. 28, 1935

INVENTOR
*Hans C. Deckel*
BY *Edward H. Cumpston*
  *his* ATTORNEY

Patented Dec. 15, 1936

2,064,341

UNITED STATES PATENT OFFICE 2,064,341

PHOTOGRAPHIC CAMERA

Hans C. Deckel, Solln, near Munich, Germany, assignor to Friedrich Deckel, Munich-Prinz Ludwigshohe, Germany Application October 28, 1935, Serial No. 46,984
In Germany December 12, 1933

7 Claims. (Cl. 95—44)

This invention relates to photographic cameras of the type including a finder lens and a photographic lens, both of which are adjustable for accurate focusing, and especially to such a camera in which the photographic lens may be removed and replaced by another photographic lens of different focal length.

An object of the invention is the provision of a generally improved, simplified, and more satisfactory arrangement for focusing the two lenses concomitantly.

Another object of the invention is the provision of focusing mechanism so designed that when one photographic lens is removed and is replaced by a different photographic lens, the focusing mechanism is still operative to focus the photographic lens and the finder lens concomitantly, but without any complicated adjustments of the mechanism being required because of the different photographic lens.

To these and other ends the invention resides in certain improvements and combinations of parts, all as will be hereinafter more fully described, the novel features being pointed out in the claims at the end of the specification.

Figure 2:
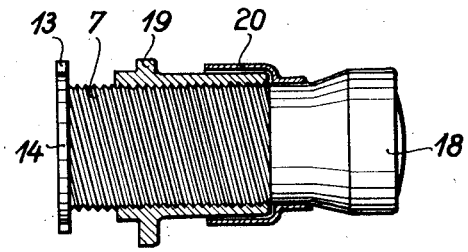

In the drawing:

Fig. 1 is a schematic cross section through the front of a camera embodying the present invention, and Fig. 2 is a view of a different photographic lens, such as a telephoto lens, which may be used in place of the photographic lens shown in Fig. 1.

The same reference numerals throughout the several views indicate the same parts.

The camera is provided with a front wall 1 in which is inserted a front plate 2 held to the wall 1 by any suitable means such as by the screws shown in the drawing. This plate 2 carries suitable apertures for receiving a finder lens 3 and a photographic lens 4. Preferably the aperture for receiving the finder lens is surrounded by an annular flange 5 internally threaded to cooperate with screw threads 6 on the holder of the finder lens. Thus when the finder lens is rotated, as by means of the knurled flange 17 accessible at the front of the camera, this rotation causes corresponding axial displacement of the finder for the purpose of accurately focusing the finder.

The holder of the photographic lens 4 has a screw thread 7 running in the opposite direction from the threads 6, and engaged with internal threads of a surrounding annular flange 8 somewhat similar to the flange 5 but formed separately from the plate 2 instead of being integral with it. This flange 8 extends through a suitable opening in the plate 2, as shown, and is held securely in this opening by any suitable fastening means, not shown in detail in the drawing, with a ring or projection seated firmly against the front face of the plate 2 so as to position the threaded flange 8 accurately in a fixed location with respect to the plate 2.

Mounted on the rear side of the plate 2 is an annular gear 9, co-axial with the lens 4 but of larger diameter than the lens, and having teeth 10 cut around its circumference. The gear 9 may be held by any suitable fastening means, such as a ring 9a suitably held to the back of the plate 2 and engaging an annular slot in the gear. The gear teeth 10 on this gear 9 are engaged with the teeth of the gear 11 secured to the rear end of the holder of the finder lens 3 so that as the finder lens is rotated to move it axially for focusing, it will cause corresponding rotation of the gear 9. It will be noted that the gear 9 is relatively wide, so that the gear 11 will remain in proper engagement with the teeth 10 of the gear 9 in all positions to which the gear 11 may be axially displaced within the range of adjustment of the finder lens.

A suitable detachable connection is provided between the gear 9 and the holder of the photographic lens 4, for turning the lens when the gear 9 is turned. This connection may comprise, for example, two or more axially extending grooves 12 in the inner peripheral face of the annular gear 9, with which may be engaged a corresponding number of radially extending lugs 13 on the flange 14 secured to the rear end of the threaded holder of the photographic lens 4. Thus, as the gear 9 is rotated by rotation of the finder lens, this rotation of the gear 9 will be transmitted through the slots 12 and lugs 13 to the photographic lens and will cause corresponding rotation of that lens relative to the stationary flange 8, thus moving the photographic lens in an axial direction by virtue of the screw threads 7, so that this lens is focused. During the axial focusing movements of the lens 4, the lugs 13 will slide axially along the grooves 12, but without becoming disengaged from them.

The pitch of the screw threads 6 is so related to the pitch of the threads 7 and to the focal length of the respective lenses, that a certain rotation of the finder lens which causes proper axial displacement to focus it for a certain distance, will also cause just the right amount of axial displacement of the photographic lens to focus it for the same distance. With this arrangement, the photographic lens may easily be replaced by another lens having a different focal length, if desired, and no change will be required in the focusing mechanism other than the mere substitution of one lens holder for another lens holder, if only the pitch of the screw threads of each separate photographic lens holder is designed in accordance with the focal length of that lens.

The photographic lens and its holder and the corresponding threaded flange 8 constitute an assemblage bodily removable and replaceable as a unit, simply by releasing the means which holds the flange 8 to the plate 2, and then pulling the lens assemblage straight outward in an axial direction, the lugs 13 meanwhile sliding outwardly through the open front ends of the slots 12 and other corresponding alined slots 15 in the plate 2. Then a different lens assemblage, carrying a lens of different focal length or of other desired different characteristics, may be slipped into the camera by a reverse procedure. When the assemblage is in place in the camera, lugs 16 on the flange 8 may extend into the slots 15 in the plate 2 to hold the flange 8 against rotation with respect to the plate 2. For example, one of the different lens assemblages provided with the camera may comprise a telephoto lens 18 (Fig. 2) having a holder provided, as before, with screw threads 7 and with a flange 14 having lugs 13 to engage the slots 12 in the gear ring 9. The internally threaded flange 19 surrounding the threads 7 of the telephoto lens is similar to the flange 8 previously described, except that it may conveniently be made longer in order to hold more securely the longer telephoto lens. Because of the greater range of focusing movement of the telephoto lens, an annular sleeve 20, secured to the lens holder, may extend rearwardly in overlapping telescoping relationship to the flange 19, as plainly shown in the drawing, so as to protect the front end portion of the threads 7 from damage or dirt when the lens is adjusted to its most forward position with respect to the sleeve 19.

In such a telephoto lens, the pitch of the screw threads would be somewhat different from the pitch of the threads used on a lens of different focal length, as already explained, but the pitch of the threads is chosen by the manufacture in accordance with his knowledge of the requirements of each individual lens, and nothing is required of the user of the camera except the simple act of taking out one lens assemblage and slipping the other desired lens assemblage into place. Inasmuch as the variable factors (i. e., the screw threads of different pitch) are all included in each unitary lens assemblage, there are no separate parts to be lost or misplaced, or to be accidentally put together in a wrong manner by the user of the camera. No change in the gearing between the finder lens and the photographic lens is required. Yet at all times, a focusing of one lens will accurately focus the other in a simple manner and with the utmost nicety.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic camera comprising a detachable and replaceable photographic lens, a finder lens, means for focusing each of said lenses, said means including screw threads, and interconnecting mechanism for operating the means for focusing one of said lenses upon operation of the means for focusing the other of said lenses, at least a part of said interconnecting mechanism being permanently associated with and bodily detachable and replaceable with said photographic lens.

2. A photographic camera comprising a photographic lens, a finder lens, means for focusing each of said lenses, one of said lenses and part of said focusing means constituting a unit bodily removable from and replaceable in the camera, and interconnecting mechanism for operating the means for focusing one of said lenses upon operation of the means for focusing the other of said lenses.

3. A photographic camera comprising a finder lens, a plurality of removable and interchangeable photographic lenses, means for focusing each of said lenses, said focusing means for said photographic lenses being at least in part associated with and removable bodily as a unit with each of said lenses, and interconnecting mechanism effective when one of said photographic lenses is mounted in said camera for operating the means for focusing one of said lenses upon operation of the means for focusing the other of said lenses.

4. A photographic camera comprising a finder lens mounted for focusing movement, interconnecting operating mechanism movable in accordance with the focusing movements of said finder lens, and a plurality of removable and replaceable photographic lens units, each unit including a photographic lens of characteristics different from those of the lenses of the other units and further including, as an integral part of the unit, means adapted to the particular characteristics of said lens for cooperation with said interconnecting operating mechanism during focusing of said photographic lens, so that when any one of said photographic lens units is placed in operative position in the camera, the photographic lens and the finder lens will be operatively connected to each other for concomitant corresponding focusing movement without any change in said interconnecting operating mechanism.

5. A removable and replaceable photographic lens unit for cameras, comprising an internally threaded hollow member for attachment to a camera, an externally threaded lens holder extending into and cooperating with the threads of said hollow member so that when holder is turned relatively to said member it will move longitudinally for focusing, a lens mounted in said holder, and lug means extending outwardly from said holder for removable engagement with means for turning said holder to focus said lens.

6. A photographic camera comprising a screw threaded finder lens holder rotatably mounted for focusing, a removable and replaceable screw threaded photographic lens holder rotatably mounted for focusing, an annular gear permanently mounted in said camera in a position surrounding said photographic lens holder, a detachable connection between said gear and said photographic lens holder for transmitting rotary movements of one to the other, and gear means operatively connecting said annular gear to said finder lens holder so that rotation of one of said lens holders will produce rotation of the other of said lens holders for concomitant focusing of lenses held by said two holders.

7. A photographic camera comprising a screw threaded finder lens holder rotatably mounted for focusing, a removable and replaceable screw threaded photographic lens holder rotatably mounted for focusing, an annular gear permanently mounted in said camera in a position surrounding said photographic lens holder, cooperating means internally of said gear and externally of said photographic lens holder for operatively connecting and disconnecting one from the other by a movement of said photographic lens holder in an axial direction relatively to said annular gear, and gear means operatively connecting said annular gear to said finder lens holder so that rotation of one of said lens holders will produce rotation of the other of said lens holders for concomitant focusing of lenses held by said two holders.

HANS C. DECKEL.